United States Patent
Reinhardt et al.

(10) Patent No.: US 9,256,535 B2
(45) Date of Patent: Feb. 9, 2016

(54) CONDITIONAL NOTIFICATION MECHANISM

(71) Applicant: Advanced Micro Devices, Inc., Sunnyvale, CA (US)

(72) Inventors: Steven K. Reinhardt, Vancouver, WA (US); Marc S. Orr, Renton, WA (US); Bradford M. Beckmann, Redmond, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 250 days.

(21) Appl. No.: 13/856,728

(22) Filed: Apr. 4, 2013

(65) Prior Publication Data
US 2014/0304474 A1    Oct. 9, 2014

(51) Int. Cl.
G06F 12/00    (2006.01)
G06F 12/08    (2006.01)
G06F 13/00    (2006.01)
G06F 13/28    (2006.01)
G06F 1/32    (2006.01)

(52) U.S. Cl.
CPC ........ *G06F 12/0811* (2013.01); *G06F 12/0875* (2013.01); *G06F 1/3206* (2013.01); *G06F 12/0817* (2013.01); *Y02B 60/1225* (2013.01)

(58) Field of Classification Search
CPC .............. G06F 1/3206; G06F 12/0811; G06F 12/0875; G06F 12/0817; Y02B 60/1225
USPC .......................................................... 711/156
See application file for complete search history.

(56) References Cited

U.S. PATENT DOCUMENTS 5,724,591 A * 3/1998 Hara et al. ..................... 713/322
6,345,344 B1 * 2/2002 Arimilli et al. ............... 711/145
7,774,631 B1 * 8/2010 Walton .......................... 713/321

OTHER PUBLICATIONS

H. Wong et al., "Pangaea: A Tightly-Coupled IA32 Heterogeneous Chip Multiprocessor," Proceedings of Parallel Architectures and Compilation Techniques (PACT) 2008.

* cited by examiner

*Primary Examiner* — Mark Giardino, Jr.
(74) *Attorney, Agent, or Firm* — Park, Vaughan, Fleming & Dowler LLP

(57) ABSTRACT

The described embodiments comprise a computing device with a first processor core and a second processor core. In some embodiments, during operations, the first processor core receives, from the second processor core, an indication of a memory location and a flag. The first processor core then stores the flag in a first cache line in a cache in the first processor core and stores the indication of the memory location separately in a second cache line in the cache. Upon encountering a predetermined result when evaluating a condition for the indicated memory location, the first processor core updates the flag in the first cache line. Based on the update of the flag, the first processor core causes the second processor core to perform an operation.

19 Claims, 3 Drawing Sheets

```
Global Declarations:

struct trigger
{
    uint wakeup_flag;
    char padding[CACHE_LINE_SIZE - sizeof(uint)];
    uint *memory_location_ptr;
    uint threshold_value;
} void mwaitc(trigger t)
{
    monitor(&t.wakeup_flag);
    mwait();
}

In the second processor core:

trigger trig;
int threshold = MIN_SCHED_GRAN;

// perform preceding operations trig.memory_location_ptr = tail_ptr;
trig.threshold_value = threshold;
trig.wakeup_flag = 0;

mwaitc(trig);

// perform subsequent operations

In the first processor core:

// perform preceding operations

// make an adjustment to the task queue tail pointer via the
// trig.memory_location pointer uint new_val = *(trig.memory_location_ptr) + update_value;
uint cur_val = *(trig.memory_location_ptr);
uint old_val = CAS(trig.memory_location_ptr, cur_val, new_val);

// determine if the amount of data in the task queue is sufficient to wake
// up the first processor core (and that the CAS completed as expected)

if(old_val == cur_val)
{
    if(new_val >= trig.threshold_value) { trig.wakeup_flag = 1; }
}

// perform subsequent operations
```

FIG. 3

CONDITIONAL NOTIFICATION MECHANISM

RELATED APPLICATION

The instant application is related to U.S. patent application Ser. No. 13/782,063, which is titled "Conditional Notification Mechanism," by inventors Steven K. Reinhardt, Marc S. Orr, and Bradford M. Beckmann, which was filed 1 Mar. 2013. The instant application is related to U.S. patent application Ser. No. 13/782,117, which is titled "Conditional Notification Mechanism," by inventors Steven K. Reinhardt, Marc S. Orr, and Bradford M. Beckmann, which was filed 1 Mar. 2013.

BACKGROUND

1. Field

The described embodiments relate to computing devices. More specifically, the described embodiments relate to a conditional notification mechanism in a computing device.

2. Related Art

Many modern computing devices include two or more entities such as central processing unit (CPU) or graphics processing unit (GPU) cores, hardware thread contexts, etc. In some cases, two or more entities in a computing device communicate with one another to determine if a given event has occurred. For example, a first CPU core may reach a synchronization point at which the first CPU core communicates with a second CPU core to determine if the second CPU core has reached a corresponding synchronization point. Several techniques have been proposed to enable entities in a computing device to communicate with one another to determine if a given event has occurred, as described below.

A first technique for communicating between entities is a "polling" technique for which a first entity, until a value in a shared memory location meets a condition, reads the shared memory location and determines if the shared memory location meets the condition. For this technique, a second (and perhaps third, fourth, etc.) entity updates the shared memory location when a designated event has occurred (e.g., when the second entity has reached a synchronization point). This technique is inefficient in terms of power consumption because the first entity is obligated to fetch and execute instructions for performing the reading and determining operations. Additionally, this technique is inefficient in terms of cache traffic because the reading of the shared memory location can require invalidation of a cached copy of the shared memory location. Moreover, this technique is inefficient because the polling entity is using computational resources that could be used for performing other computational operations.

A second technique for communicating between entities is an interrupt scheme, in which an interrupt is triggered by a first entity in order to communicate with a second (and perhaps third, fourth, etc.) entity. This technique is inefficient because processing interrupts in the computing device requires numerous operations be performed. For example, in some computing devices, it is necessary to flush instructions from one or more pipelines and save state before an interrupt handler can process the interrupt. In addition, in some computing devices, processing an interrupt requires communicating the interrupt to an operating system on the computing device for prioritization and may require invoking scheduling mechanisms (e.g., a thread scheduler, etc.).

A third technique for communicating between entities is the use of instructions such as the MONITOR and MWAIT instructions. For this technique, upon executing a MONITOR instruction, the first entity configures a cache coherency mechanism in the computing device to monitor for updates to a designated memory location. Upon subsequently executing the MWAIT instruction, the first entity signals the coherency mechanism (and the computing device generally) that it is transitioning to a wait (idle) state until an update (e.g., a write) is made to the memory location. When a second entity updates the memory location by writing to the memory location, the coherency mechanism recognizes that the update has occurred and forwards a wake-up signal to the first entity, causing the first entity to exit the idle state. This technique is useful for simple cases where a single update is made to the memory location. However, when a value in the memory location is to meet a condition, the technique is inefficient. For example, assuming that the condition is that the memory location, which starts at a value of 0, is to be greater than 25, and that the second entity increases the value in the memory location by at least one each time an event occurs. In this case, the first entity may be obligated to execute the MONITOR/MWAIT instructions and conditional checking instructions as many as 26 times before the value in the memory location meets the condition.

A fourth technique for communicating between entities employs a user-level interrupt mechanism where a first entity specifies the address of a memory location ("flag"). When a second entity subsequently updates/sets the flag, the first entity is signaled to execute an interrupt handler. For this technique, much of the control for handling the communication between the entities is passed to software and thus to the programmer. Because software is used for handling the communication between the entities, this technique is inefficient and error-prone.

As described above, the various techniques that have been proposed to enable entities to communicate with one another to determine if a given event has occurred are inefficient in one way or another.

SUMMARY

The described embodiments comprise a computing device with a first processor core and a second processor core. In some embodiments, during operations, the first processor core receives, from the second processor core, an indication of a memory location (e.g., a pointer to the memory location, an address of the memory location, etc.) and a flag. The first processor core then stores the flag in a first cache line in a cache in the first processor core and stores the indication of the memory location separately in a second cache line in the cache. Upon encountering a predetermined result when evaluating a condition for the indicated memory location, the first processor core updates the flag in the first cache line. Based on the update of the flag, the first processor core causes the second processor core to perform an operation.

BRIEF DESCRIPTION OF THE FIGURES

FIG. 3 presents pseudocode illustrating a series of operations performed by a first processor core and a second processor core for monitoring data in a task queue in accordance with some embodiments.

DETAILED DESCRIPTION

Figure 1:
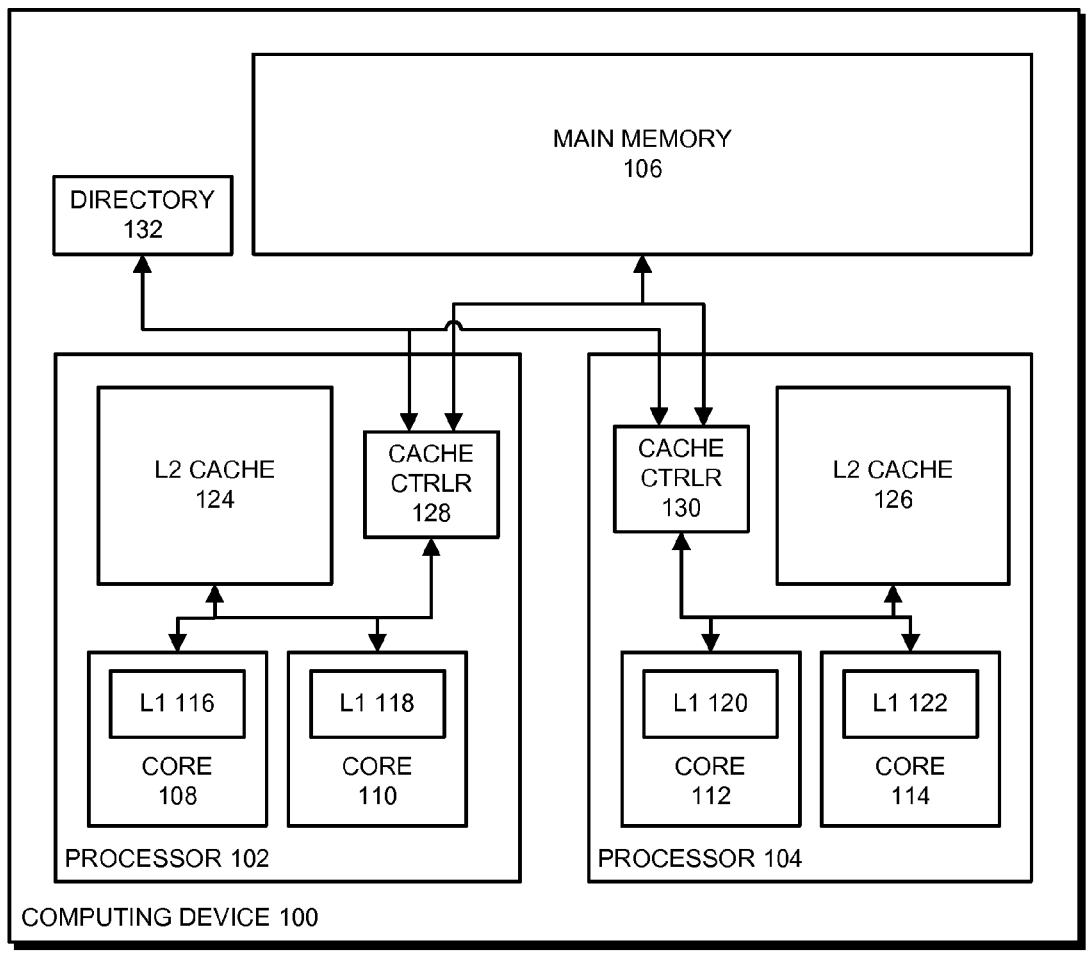
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory and/or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware/microcode, etc.) to perform the operations.

In some embodiments, a data structure representative of some or all of the structures and mechanisms described herein (e.g., some or all of computing device 100) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., machine code, firmware, etc.) to perform the described operations.

OVERVIEW

The described embodiments include mechanisms to enable a first processor core (or a directory, a cache, a monitoring mechanism, etc.) in a computing device to receive, from a second processor core, an indication that a memory location is to be monitored. Upon receiving the indication, the first processor core monitors the memory location to determine when the memory location is updated (e.g., when a value in the memory location is changed). When the memory location is updated, the first processor core sends a signal to the second processor core. Upon receiving the signal, the second processor core performs a corresponding action.

In some embodiments, to enable the monitoring, the first processor core receives, from the second processor core, an indication of a memory location (e.g., a pointer, an address, etc.), a threshold value, and a flag. In these embodiments, the flag is stored in the monitored memory location. The first processor core updates the flag (e.g., sets the flag to a new value) when a value in the indicated memory location has a predetermined relationship (e.g., greater than or equal to, etc.) to the threshold value. In other words, the first processor core keeps track of the value in the indicated memory location and updates the flag when the value in the memory location has the predetermined relationship to the threshold value.

In some embodiments, upon receiving the indication of the memory location, the threshold value, and the flag, the first processor core stores the flag in a first cache line in a cache in the first processor core, and separately stores the indication of the memory location and the threshold value in a second cache line. In this way, the first processor core enables cache-line-level monitoring for updates to the flag without erroneously detecting updates to the indicated memory location as updates to the flag (as is described in more detail below). In some embodiments, the second processor core generates a data structure (or "struct") that includes padding data that causes the first processor core to store the flag in the first cache line and separately store the indication of the memory location and the threshold value in the second cache line.

The described embodiments enable the second processor core to cause the first processor core to signal the second processor core to perform an action when a condition is met for an indicated memory location. In this way, the second processor core can have the indicated memory location monitored without itself performing all of the monitoring operations, which can enable more efficient operation of a computing device in which the processor cores are located.

Computing Device

FIG. 1 presents a block diagram illustrating a computing device 100 in accordance with some embodiments. As can be seen in FIG. 1, computing device 100 includes processors 102-104 and main memory 106. Processors 102-104 are generally devices that perform computational operations in computing device 100. Processors 102-104 include four processor cores 108-114, each of which includes a computational mechanism such as a central processing unit (CPU), a graphics processing unit (GPU), and/or an embedded processor.

Processors 102-104 also include cache memories (or "caches") that can be used for storing instructions and data that are used by processor cores 108-114 for performing computational operations. The caches in processors 102-104 include a level-one (L1) cache 116-122 (e.g., "L1 116") in each processor core 108-114 that is used for storing instructions and data for use by the corresponding processor core. Generally, L1 caches 116-122 are the smallest of a set of caches in computing device 100 and are located closest to the circuits (e.g., execution units, instruction fetch units, etc.) in the respective processor cores 108-114. The closeness of the L1 caches 116-122 to the corresponding circuits enables the fastest access to the instructions and data stored in the L1 caches 116-122 from among the caches in computing device 100.

Processors 102-104 also include level-two (L2) caches 124-126 that are shared by processor cores 108-110 and 112-114, respectively, and hence are used for storing instructions and data for all of the sharing processor cores. Generally, L2 caches 124-126 are larger than L1 caches 116-122 and are located outside, but close to, processor cores 108-114 on the same semiconductor die as processor cores 108-114. Because L2 caches 124-126 are located outside the corresponding processor cores 108-114, but on the same die, access to the instructions and data stored in L2 cache 124-126 is slower than accesses to the L1 caches.

Each of the L1 caches 116-122 and L2 caches 124-126, (collectively, "the caches") include memory circuits that are used for storing cached data and instructions. For example, the caches can include one or more of static random access memory (SRAM), embedded dynamic random access memory (eDRAM), DRAM, double data rate synchronous DRAM (DDR SDRAM), and/or other types of memory circuits.

Main memory 106 comprises memory circuits that form a "main memory" of computing device 100. Main memory 106 is used for storing instructions and data for use by the processor cores 108-114 on processor 102-104. In some embodiments, main memory 106 is larger than the caches in computing device 100 and is fabricated from memory circuits such as one or more of DRAM, SRAM, DDR SDRAM, and/or other types of memory circuits.

Taken together, L1 caches 116-122, L2 caches 124-126, and main memory 106 form a "memory hierarchy" for computing device 100. Each of the caches and main memory 106 are regarded as levels of the memory hierarchy, with the lower levels including the larger caches and main memory 106. Within computing device 100, memory requests are preferentially handled in the level of the memory hierarchy that results in the fastest and/or most efficient operation of computing device 100.

In addition to processors 102-104 and memory 106, computing device 100 includes directory 132. In some embodiments, processor cores 108-114 may operate on the same data (e.g., may load and locally modify data from the same locations in memory 106). Computing device 100 generally uses directory 132 (or another mechanism such as cache controller(s), etc.) to avoid different caches (and memory 106) holding copies of data in different states—to keep data in computing device 100 "coherent." Directory 132 is a functional block that includes mechanisms for keeping track of cache blocks/data that are held in the caches, along with the coherency state in which the cache blocks are held in the caches (e.g., using the MOESI coherency states modified, owned, exclusive, shared, invalid, and/or other coherency states). In some embodiments, as cache blocks are loaded from main memory 106 into one of the caches in computing device 100 and/or as a coherency state of the cache block is changed in a given cache, directory 132 updates a corresponding record to indicate that the data is held by the holding cache, the coherency state in which the cache block is held by the cache, and/or possibly other information about the cache block (e.g., number of sharers, timestamps, etc.). When a processor core or cache subsequently wishes to retrieve data or change the coherency state of a cache block held in a cache, the processor core or cache checks with directory 132 to determine if the data should be loaded from main memory 106 or another cache and/or if the coherency state of a cache block can be changed.

As can be seen in FIG. 1, processors 102-104 include cache controllers 128-130 ("cache ctrlr"), respectively. Each cache controller 128-130 is a functional block with mechanisms for handling accesses to main memory 106 and communications with directory 132 from the corresponding processor 102-104.

Although an embodiment is described with a particular arrangement of processors and processor cores, some embodiments include a different number and/or arrangement of processors and/or processor cores. For example, some embodiments have two, six, eight, or another number of processor cores—with the cache hierarchy adjusted accordingly. Generally, the described embodiments can use any arrangement of processors and/or processor cores that can perform the operations herein described.

Additionally, although an embodiment is described with a particular arrangement of caches and directory 132, some embodiments include a different number and/or arrangement of caches and/or do not include directory 132. For example, the caches (e.g., L1 caches 116-122, etc.) can be divided into separate instruction and data caches. Additionally, L2 cache 124 may not be shared in the same way as shown, and hence may only be used by a single processor core, two processor cores, etc. (and hence there may be multiple L2 caches 124 in each processor 102-104). As another example, some embodiments include different levels of caches, from only one level of cache to multiple levels of caches, and these caches can be located in processors 102-104 and/or external to processor 102-104. For example, some embodiments include one or more L3 caches (not shown) in the processors or outside the processors that is used for storing data and instructions for the processors. Generally, the described embodiments can use any arrangement of caches that can perform the operations herein described.

Moreover, although computing device 100 and processors 102-104 are simplified for illustrative purposes, in some embodiments, computing device 100 and/or processors 102-104 include additional mechanisms for performing the operations herein described and other operations. For example, computing device 100 and/or processors 102-104 can include power controllers, mass-storage devices such as disk drives or large semiconductor memories (as part of the memory hierarchy), batteries, media processors, input-output mechanisms, communication mechanisms, networking mechanisms, display mechanisms, etc.

Cache

Figure 2:
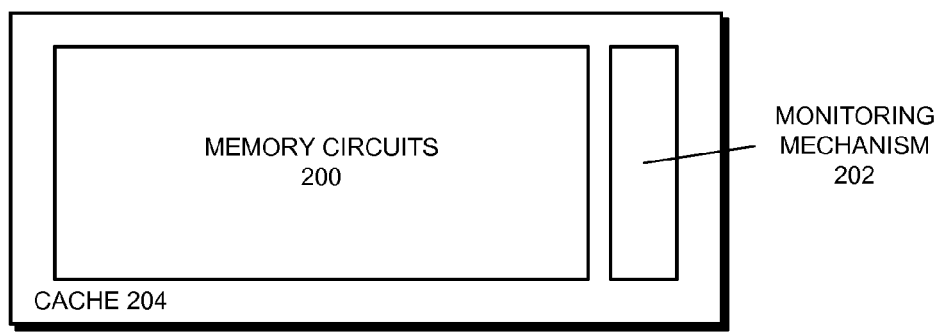
FIG. 2 presents a block diagram illustrating a cache in accordance with some embodiments.

FIG. 2 presents a block diagram illustrating a cache 204 in accordance with some embodiments. In some embodiments, some or all of the caches in computing device 100 (e.g., L1 116, L2 124, etc.) may comprise, but are not required to comprise, internal structures similar to those shown in FIG. 2.

As can be seen in FIG. 2, cache 204 comprises memory circuits 200 and monitoring mechanism 202. Memory circuits 200, which comprise one or more of static random access memory (SRAM), embedded dynamic random access memory (eDRAM), DRAM, double data rate synchronous DRAM (DDR SDRAM), and/or other types of memory circuits, are used for storing cached data and instructions in cache 204.

Monitoring mechanism 202 is a functional block that is configured for performing operations for monitoring cache blocks (e.g., cache lines or other portions of memory circuits 200) as part of an operation of monitoring a memory location. In some embodiments, upon receiving an identifier of a memory location that is to be monitored from an associated processor core, monitoring mechanism 202 stores the identifier for the memory location in a watch table (or other memory element). When a cache line in memory circuits 200 is subsequently changed (e.g., when a value in a cache line is changed), monitoring mechanism 202 determines if the cache line is listed in the watch table. If so, monitoring mechanism 202 signals the associated processor core that a watched memory location (the copy of the memory location stored in a cache block in memory circuits 200) has changed. The associated processor core may then perform subsequent operations based on the change in the memory location.

Although cache 204 is shown with particular mechanisms, in some embodiments, cache 204 includes different and/or additional mechanisms. Generally, cache 204 includes sufficient mechanisms to perform the operations herein described.

Lower-Power and Higher-Power Operating Modes

As described herein, in some embodiments, some or all of a processor core may transition from a higher-power mode to a lower-power mode, or vice versa. In some embodiments, the lower-power mode comprises any operating mode in which less electrical power and/or computational power is consumed by a processor core than in the higher-power mode. For example, the lower-power mode may be an idle mode, in which some or all of a set of processing circuits in the processor core (e.g., one or more computational pipelines in the processor core, one or more hardware thread contexts in the processor core, etc.) are halted or operating at a reduced rate. As another example, the lower-power mode may be a sleep or powered-down mode where an operating voltage for some or all of the processor core is reduced and/or control signals (e.g., clocks, strobes, precharge signals, etc.) for some or all of the processor core are slowed or stopped. Note that, in some embodiments, at least a portion of the processor core continues to operate in the lower-power mode. For example, in some embodiments, the processor core remains sufficiently operable to send and receive signals for communicating between processor cores and for performing other operations.

In some embodiments, the higher-power mode comprises any operating mode in which more electrical power and/or computational power is consumed by the processor core than in the lower-power mode. For example, the higher-power mode may be an active mode, in which some or all of a set of processing circuits in the processor core (e.g., a computational pipeline, a processor core, a hardware thread context, etc.) are operating at a typical/normal rate. As another example, the higher-power mode may be an awake/normal mode in which an operating voltage for some or all of the processor core is set to a typical/normal voltage and/or control signals (e.g., clocks, strobes, precharge signals, etc.) for some or all of the processor core are operating at typical/normal rates.

Monitoring a Memory Location

In some embodiments, a first processor core and a second processor core are configured to execute program code that is part of an application, firmware, and/or an operating system for each processor core to enable the first processor core to monitor a memory location on behalf of the second processor core. For example, the memory location may hold a flag that is monitored by the first processor core on behalf of the second processor core. In these embodiments, when a given condition is met, the first processor core modifies a value in the memory location. For example, when a value in another memory location exceeds a threshold (the condition), the first processor can update the flag in the memory location. Because the first processor core is monitoring the memory location, the modification of the memory location causes the first processor core to send a signal to the second processor core to cause the second processor core to perform a corresponding action. Some embodiments that perform these operations are described in the following paragraphs.

In some embodiments, the second processor core (i.e., the processor core that is to receive the notification when the memory location meets the condition) is a processor core that is configured to perform a task on a batch or set of data. For example, in some embodiments, the second processor core is a CPU or GPU processor core that is configured to perform multiple parallel tasks simultaneously (e.g., pixel processing or simultaneous instruction, multiple data operations). In these embodiments, the first processor core (i.e., the processor core that is to monitor the memory location) is a scheduling processor core/mechanism that is configured to keep track of available data and to cause the second processor core to perform the parallel tasks when a sufficient batch or set of data is available to use a designated amount of the parallel processing power of the second processor core. In these embodiments, the first processor core can keep track of an amount of data in a task queue (e.g., a tail pointer that indicates the "end" of the task queue) to determine when an amount of data in the task queue is sufficient to cause the second processor core to begin processing a set of tasks in parallel. For example, in embodiments where the task is pixel processing, the first processor can determine when sufficient pixels are available in the task queue for processing by the second processor core.

In some embodiments, to enable the first processor core to keep track of the data in the task queue, the second processor core communicates to the first processor core: (1) a pointer to (or other indicator of) the end of the task queue; (2) a threshold amount of data to be available in the task queue before the second processor core is to begin performing the tasks; and (3) a flag. For example, in some embodiments, the second processor core generates and stores a data struct/struct to a memory with the flag, the pointer, and the threshold to a memory, from where the first processor core acquires the struct. The second processor core then executes a MONITOR instruction on the memory location where the flag is stored that causes the first processor core to begin monitoring the memory location where the flag is stored. The second processor core next executes an MWAIT instruction that causes the second processor core to transition to a lower-power mode. (The MONITOR and MWAIT instructions are known in the art and hence will not be described further.)

Upon receiving one or more signals indicating that the MONITOR instruction for the memory location where the flag is stored and the MWAIT instruction were executed by the second processor core, the first processor core begins to monitor the memory location where the flag is stored. In order to enable monitoring the memory location, the first processor core loads a copy of the memory location where the flag is stored to a first cache line in a local cache (e.g., to an L1 cache) and begins to monitor the first cache line for changes. The first processor core also loads the pointer to the tail of the task queue and the threshold value received from the second processor core to a second cache line in the local cache. The pointer and the threshold value are then used by the first processor core to determine when an amount of data in the task queue is sufficient to cause the second processor core to begin processing the tasks in the task queue.

Note that the pointer and threshold value and the flag are loaded to separate/different cache lines in the local cache by the first processor core; this enables the first processor core to monitor the cache line with the copy of the flag memory location for changes (as requested by the earlier-executed MONITOR instruction) without also detecting changes in the task queue via the pointer (which would occur if the pointer and the flag were stored in the same cache line). In some embodiments, the above-described struct generated by the second processor core is configured so that, when the struct is loaded into the local cache, the pointer and threshold value and the flag are stored in different cache lines. For example, in some embodiments, the struct includes padding data that separates the flag from the pointer and the threshold value.

In addition to monitoring the first cache line (where the copy of the memory location for the flag) is stored, the first processor core begins to keep track of the amount of data in the task queue to determine when the amount of data is greater than or equal to the threshold value. For example, each time that data is added to the task queue, the first processor core can check the pointer to the end of the task queue to determine if the amount of data is equal to or exceeds the threshold. When the amount of data is equal to or exceeds the threshold, the first processor core updates the flag in the first cache line. As described above, the first processor core is monitoring the first cache line to determine when the flag is updated based on the earlier-executed MONITOR instruction. Thus, upon making the update to the flag in the first cache line, the first processor core detects the update and causes the second processor core to perform an operation by sending a wake-up signal to the second processor core. The wake-up signal causes the second processor core to transition to a higher-power mode in which the tasks in the task queue are processed.

FIG. 3 presents pseudocode illustrating a series of operations performed by a first processor core and a second processor core for monitoring data in a task queue in accordance with some embodiments. For the embodiment shown in FIG. 3, the operations are similar to operations that may be performed for the above-described task-performing processor core and scheduling processor core/mechanism (which are described as a second processor core and a first processor core, respectively, for FIG. 3). However, the operations shown in FIG. 3 are presented as a general example of functions performed by some embodiments. The operations performed by other embodiments include different operations and/or operations that are performed in a different order. In addition, although certain mechanisms in computing device 100 are used in describing the operations in FIG. 3, in some embodiments, other mechanisms can perform the operations.

As can be seen in FIG. 3, the pseudocode includes a set of global declarations that comprise a declaration of a trigger struct and an mwaitc function. The trigger struct includes a wakeup flag, a padding value, a pointer to a memory location, and a threshold value for which the memory location is to be monitored. The padding value is configured to cause the flag to be stored on a first cache line and the pointer and the threshold value to be separately stored on a second cache line so that the cache line with the flag can be monitored as described herein. The mwaitc function includes a MONITOR instruction for the wakeup flag in a trig struct (t.wakeup_flag) that causes the first processor core to monitor the memory location where the flag is stored (as described below) and an MWAIT instruction that causes the second processor core to enter a lower-power mode. The MONITOR and MWAIT instructions are known in the art and hence are not described in detail.

During operation, the second processor core instantiates a trigger struct "trig" and an int variable threshold that is set equal to MIN_SCHED_GRAN, or "minimum scheduling granularity," which is equal to an amount of data in the task queue that is sufficient to cause the second processor core to begin processing the tasks in the task queue. The second processor core then sets the memory location pointer in the trig struct (trig.memory_location_ptr) to the tail pointer of the task queue (tail_ptr), sets the threshold value in the trig struct (trig.theshold_value) equal to the threshold variable, and sets/initializes the wakeup flag (trig.wakeup_flag) to zero. The second processor core next executes the mwaitc function, which means executing the MONITOR instruction with the wakeup flag (trig.wakeup_flag) as the argument. Executing this instruction sends a signal to the first processor core that causes the first processor core to begin monitoring the memory location where the wakeup flag is stored (or, more specifically, a copy of the memory location loaded to a first cache line in a local cache in the first processor core). Next, the second processor core executes the MWAIT instruction, which causes the second processor core to transition to a lower-power mode.

After the mwaitc function is executed by the second processor core and the corresponding signals caused by executing the MONITOR and MWAIT instructions are received in the first processor core, as part of subsequent operations, the first processor core or another entity in computing device 100 updates the task queue by adding data to the task queue. Based on the update of the task queue, the first processor core performs a corresponding update to the tail pointer (tail_ptr) of the task queue by adding, to the tail pointer and via the pointer to the memory location (trig.memory_location_ptr), an update value (update_value) that is proportional to the amount of data added to the task queue. As part of the operation of updating the tail pointer, the first processor core uses a compare and swap (CAS) instruction to perform the update (the new_val, cur_val, and old_val variables are used for the CAS instruction as shown). As is known in the art, the CAS instruction compares an existing/present value of the memory location (which is the tail pointer of the task queue, as pointed to by trig.memory_location_ptr) to the cur_val input and overwrites the memory location with the new_val when they match. CAS also returns the existing value (to which old_val is set in the example in FIG. 3).

Next, the first processor core uses the old_val, the new_val, the cur_val, and trig.threshold_value to determine if an amount of data in the task queue is sufficient to wake up the second processor core to begin processing the data in the task queue. While making the determination, the first processor core first compares old_val to cur_val to ensure that the CAS completed as expected (e.g., that there was no conflicting write to the memory location pointed to by trig.memory_location_ptr—which is the tail pointer of the task queue—during the update of the tail pointer). If the CAS completed as expected, the first processor core compares new_val (which represents the updated amount of data in the task queue) to the threshold value (trig.threshold_value). If new_val is greater than or equal to the threshold, the amount of data in the queue is sufficient to cause the second processor core to begin processing the data in the task queue. In this case, the first processor core sets the wakeup flag (trig.wakeup_flag) to 1, thereby changing the value in a cache line that is being monitored by the first processor core responsive to the MONITOR instruction earlier-executed by the second processor core. Although not shown in FIG. 3, because the monitored cache line, which contains the wakeup flag, has changed, the first processor core sends a wakeup signal to the second processor core that causes the second processor core to transition from the lower-power mode to the higher-power mode.

Although an example is presented where the first and second processor cores are a scheduling mechanism and a task processor, some or all of the operations performed by these embodiments may be performed by other embodiments to achieve different outcomes and/or by different types of processor cores. Generally, the described embodiments may use any set of instructions, arrangement of data structure(s), etc. for communicating a condition under which a memory location is to be updated, so that a signal is communicated between the first processor core and the second processor core to cause the second processor core to perform an operation.

Entities for Performing the Operations

Although embodiments are described using processor cores (or portions thereof) as examples, in some embodiments, different entities can perform some or all of the operations herein described. For example, in some embodiments, a first and second thread executing on a single processor core can perform the operations herein described. In this example, the first thread communicates the indication of the memory location (e.g., a pointer to the memory location, an address of the memory location, etc.), the threshold value, and the flag. The second thread then uses the indication of the memory location, the threshold value, and the flag to interact with the first thread as herein described.

Process for Monitoring a Memory Location

Figure 4:
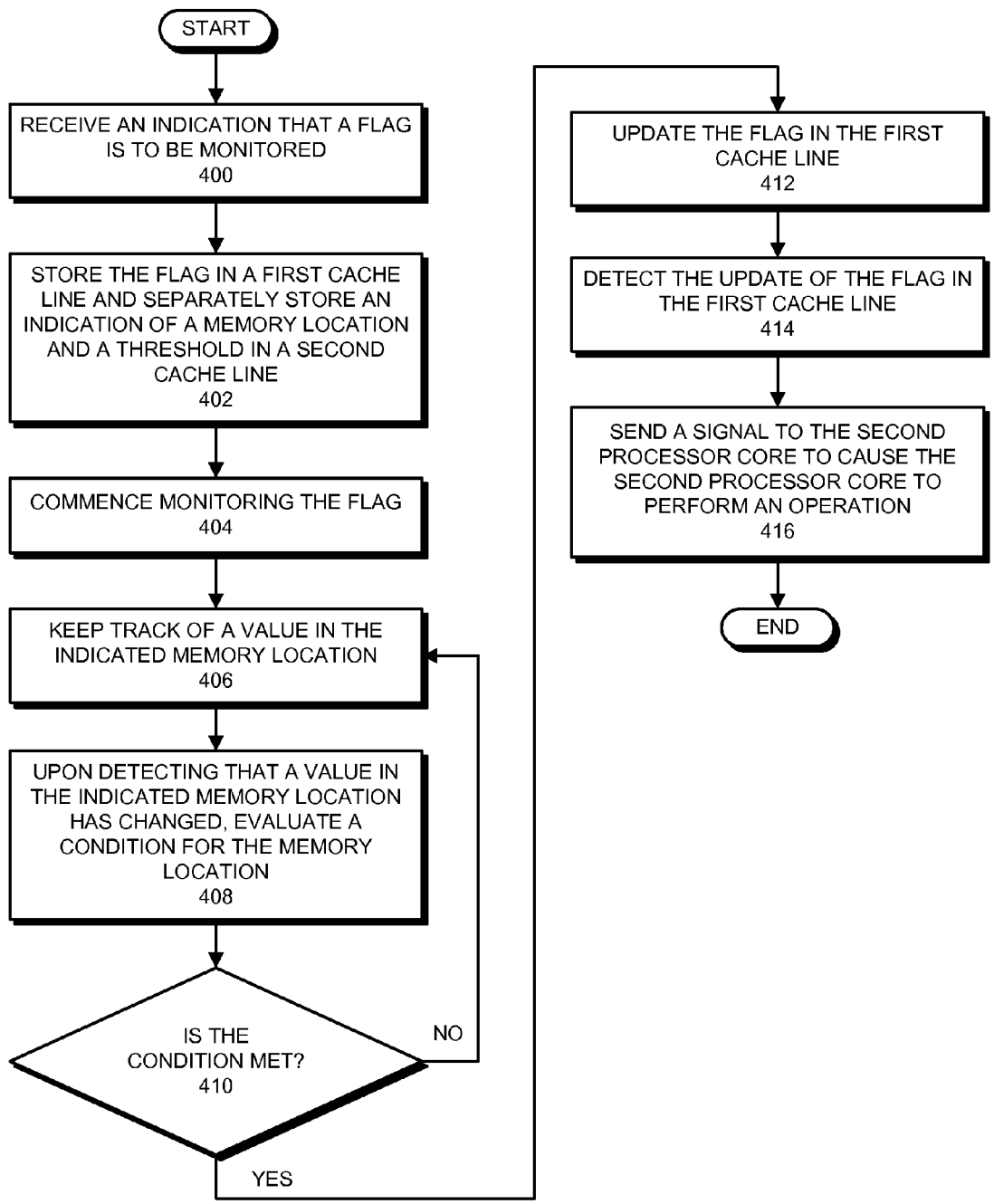
FIG. 4 presents a flowchart illustrating a process for using a flag in memory to enable a first processor core to signal a second processor core when a condition is met in accordance with some embodiments.

FIG. 4 presents a flowchart illustrating a process for using a flag in memory to enable a first processor core to signal a second processor core when a condition is met in accordance with some embodiments. Note that the operations shown in FIG. 4 are presented as a general example of functions performed by some embodiments. The operations performed by other embodiments include different operations and/or operations that are performed in a different order. In addition, although certain mechanisms in computing device 100 are used in describing the operations in FIG. 4, in some embodiments, other mechanisms can perform the operations. For example, in some embodiments, the some or all of the operations can be performed by one or more hardware thread contexts, monitoring mechanisms, scheduling mechanisms, etc.

The process shown in FIG. 4 starts when a second processor core stores a flag, an indication of a memory location (e.g., a pointer to the memory location, an address of the memory location, etc.), and a threshold value to a memory that is accessible by a first processor core. For example, in some embodiments, the second processor core generates a data structure (or "struct") that includes the flag, the indication of the memory location, and the threshold value, and stores the struct in the memory.

The first processor core then receives, from the second processor core, an indication the flag is to be monitored (step 400). In some embodiments, the first processor core receives an indication that the second processor core executed a MONITOR instruction for the flag (i.e., an instruction that causes the first processor core to monitor a memory location occupied by the flag) and an MWAIT instruction. Recall that the MONITOR and MWAIT instructions are known in the art and hence are not described in detail.

The first processor core then stores copies of the flag, the indication of the memory location, and the threshold value to a cache in the first processor core (e.g., L1 cache 116). More specifically, the first processor core stores the flag in a first cache line and separately stores the indication of the memory location and the threshold value in a second cache line (step 402). In these embodiments, because the first processor monitors the flag in response to the MONITOR instruction, if the flag and the indication of the memory location were to be stored on the same cache line, each time that the memory location was updated (and hence the cache line in which both the flag and the memory location were stored), the first processor core would detect the update to the cache line as an update to the flag. To enable cache-line-level monitoring of the flag, these embodiments store the indication of the memory location and the flag in separate cache lines as described. In some embodiments, the second processor core adds padding data to the above-described struct that causes the first processor core to automatically store the flag and the indication of the memory location on separate cache lines.

The first processor core then commences monitoring the flag in the first cache line in the cache (step 404). For example, in some embodiments, a monitoring mechanism such as monitoring mechanism 202 in the cache is configured by the first processor core to monitor the first cache line.

In addition to monitoring the flag in the first cache line, the first processor core keeps track of a value in the indicated memory location (step 406). Upon detecting that a value in the indicated memory location has changed, the first processor core evaluates a condition for the memory location (step 408). To evaluate the condition, in some embodiments, the first processor core determines if the value in the memory location has a corresponding relationship to the threshold value provided by the second processor core. In these embodiments, the first processor core can perform one or more mathematical (addition, multiplication, etc.), bitwise (shift, rotate, mask, etc.), combinatorial (AND, XOR, etc.), comparison (less than, greater than, equal to, not equal to, etc.) and/or complex logical operations on the threshold value and/or the value in the indicated memory location to arrive at a result that indicates if the value in the indicated memory location has the predetermined relationship with the threshold value. For instance, the first processor core can determine if the value in the indicated memory location is greater than, less than, equal to, not equal to, etc. the threshold value (or some second value computed from the threshold value).

If the condition is not met (step 410), the first processor core returns to step 406 to continue to keep track of a value in the indicated memory location (and continues monitoring the flag). Otherwise, if the condition is met (step 410), the first processor core updates the flag in the first cache line (step 412). Recall that the first processor core (e.g., the monitoring mechanism 202 in the cache) is monitoring the flag in the first cache line based on the request received from the second processor core in step 400. Thus, upon updating the flag in the first cache line, the first processor detects the update of the flag (step 414) and sends a signal to the second processor core to cause the second processor core to perform an operation (step 416). For example, the first processor core may send a wakeup signal that causes the second processor core to transition from a lower-power mode to a higher-power mode.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a computing device, comprising:
in a first processor core, performing operations for:
receiving, from a second processor core, an indication of a memory location, a threshold value to be used when evaluating a condition for the memory location, and a flag;
storing the flag in a first cache line in a cache in the first processor core;
storing the indication of the memory location and the threshold value in a second cache line in the cache, the second cache line being separate from the first cache line;
upon encountering a predetermined result when evaluating the condition for the indicated memory location, updating the flag in the first cache line; and
based on the update of the flag, causing the second processor core to perform an operation.

2. The method of claim 1, wherein receiving the indication of the memory location and the flag from the second processor core comprises:
receiving a data structure from the second processor core that comprises the indication of the memory location and the flag, wherein the data structure is configured so that, when the indication of the memory location and the flag are stored in the cache in the first processor core, the flag is stored in the first cache line and the indication of the memory location is separately stored in the second cache line.

3. The method of claim 1, wherein the condition comprises:
a conditional test to determine if a value in the indicated memory location has a corresponding relationship to the threshold value.

4. The method of claim 3, wherein the relationship of the value in the indicated memory location to the threshold value comprises at least one of:
greater than;
less than;
equal to; and
not equal to.

5. The method of claim 1, wherein the method further comprises:
detecting that a value in the indicated memory location has been changed;
evaluating the condition for the indicated memory location; and
upon encountering the predetermined result of the evaluation of the condition, updating the flag in the first cache line.

6. The method of claim 1, wherein causing the second processor core to perform the operation comprises:
causing the second processor core to transition from a first power mode to a second power mode.

7. The method of claim 6, wherein the first power mode is a lower-power mode and the second power mode is a higher-power mode.

8. The method of claim 6, wherein the first power mode is a higher-power mode and the second power mode is a lower-power mode.

9. The method of claim 6, wherein the method further comprises:
receiving a first indication that a MONITOR instruction was executed in the second processor core, the first indication causing the first processor core to keep track of the indicated memory location to determine if the memory location meets the condition and to monitor the flag; and
receiving a second indication that an MWAIT instruction was executed in the second processor core, the second indication causing the first processor core to cause the second processor core to transition from the first power mode to the second power mode upon updating the flag.

10. An apparatus, comprising:
a first processor core;
a cache coupled to the first processor core;
wherein the first processor core is configured to:
receive, from a second processor core, a indication of a memory location, a threshold value to be used when evaluating a condition for the memory location, and a flag;
store the flag in a first cache line in the cache;
store the indication of the memory location and the threshold value in a second cache line in the cache, the second cache line being separate from the first cache line;
upon encountering a predetermined result when evaluating the condition for the indicated memory location, update the flag in the first cache line; and
based on the update of the flag, cause the second processor core to perform an operation.

11. The apparatus of claim 10, wherein, when receiving the indication of the memory location and the flag, the first processor core is configured to:
receive a data structure from the second processor core that comprises the indication of the memory location and the flag, wherein the data structure is configured so that, when the indication of the memory location and the flag are stored in the cache in the first processor core, the flag is stored in the first cache line and the indication of the memory location is separately stored in the second cache line.

12. The apparatus of claim 10, wherein the condition comprises:
a conditional test to determine if a value in the indicated memory location has a corresponding relationship to the threshold value.

13. The apparatus of claim 12, wherein the relationship of the value in the indicated memory location to the threshold value comprises at least one of:
greater than;
less than;
equal to; and
not equal to.

14. The apparatus of claim 10, wherein the first processor core is configured to:
detect that a value in the indicated memory location has been changed;
evaluate the condition for the indicated memory location; and
upon encountering the predetermined result of the evaluation of the condition, update the flag in the first cache line.

15. The apparatus of claim 10, wherein, when causing the second processor core to perform the operation, the first processor core is configured to:

cause the second processor core to transition from a first power mode to a second power mode.

16. The apparatus of claim 15, wherein the first power mode is a lower-power mode and the second power mode is a higher-power mode.

17. The apparatus of claim 15, wherein the first power mode is a higher-power mode and the second power mode is a lower-power mode.

18. The apparatus of claim 15, wherein the first processor core is configured to:

receive a first indication that a MONITOR instruction was executed in the second processor core, the first indication causing the first processor core to keep track of the indicated memory location to determine if the memory location meets the condition and to monitor the flag; and receive a second indication that an MWAIT instruction was executed in the second processor core, the second indication causing the first processor core to cause the second processor core to transition from the first power mode to the second power mode upon updating the flag.

19. A computing device, comprising:
a first processor core;
a second processor core coupled to the first processor core;
a main memory coupled to the first processor core and the second processor core; and
a cache coupled to the first processor core;
wherein the first processor core is configured to:
receive, from the second processor core, a indication of a memory location, a threshold value to be used when evaluating a condition for the memory location, and a flag;
store the flag in a first cache line in the cache;
store the indication of the memory location and the threshold value in a second cache line in the cache, the second cache line being separate from the first cache line;
upon encountering a predetermined result when evaluating the condition for the indicated memory location, update the flag in the first cache line; and
based on the update of the flag, cause the second processor core to perform an operation.

* * * * *